United States Patent Office 3,514,375
Patented May 26, 1970

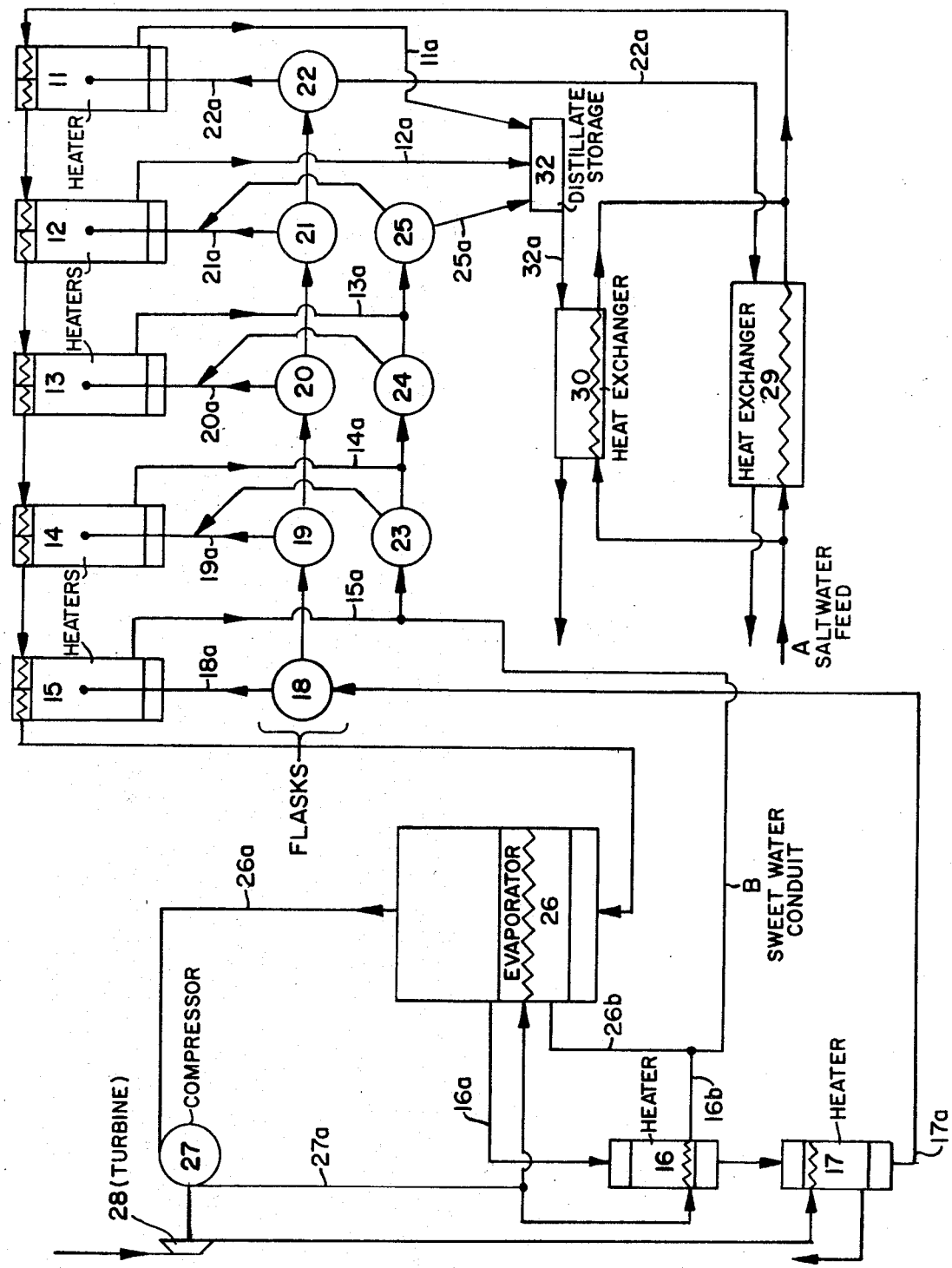

3,514,375
WATER DESALINATION DISTILLATION INCLUDING EVAPORATOR AND COMPRESSOR
Francis Dambrine, Marcq-en-Baroeul, France, assignor to Societe Fives Lille-Cail, Paris, France
Filed May 13, 1968, Ser. No. 728,700
Claims priority, application France, May 25, 1967, 107,755
Int. Cl. B01d 3/06; C02d 1/06
U.S. Cl. 202—173  4 Claims

ABSTRACT OF THE DISCLOSURE

In a water desalination installation, an evaporator is arranged behind the last of a series of salt water heaters, a compressor receives vapor from the evaporator and compresses it, and the compressor feeds compressed vapor to the radiators of the compressor and of an additional heater.

Background and summary of the invention

The present invention relates to installations for producing sweet water from salt water.

In conventional installations of this type, the salt water flows through a conduit and is heated in a series of heaters arranged in the conduit. A series of flasks is arranged to receive the heated salt water, and the heated salt water is partially evaporated in the flasks by expansion. The resultant steam or vapor is fed to the heaters where the salt water vapor is condensed in the form of sweet water, and a sweet water conduit receives the condensed sweet water.

It is known that the heat output of such installations increases with the number of heaters and associated evaporator flasks but so does the cost of the installation, thus raising the cost of the sweet water production.

It is the primary object of this invention to increase the output of water desalination installations while decreasing the caloric requirements per ton of sweet water produced, and without notably increasing plant investment.

This and other objects are acomplished in accordance with the invention by arranging an evaporator in the salt water conduit, which receives heated salt water from one of the heaters, preferably the last one in the series of heaters. There is also provided a compressor receiving vapor from the evaporator and compressing the vapor, the compressor being connected to the radiator of the evaporator and to the radiator of one of the heaters, which is preferably an additional heater arranged downstream in the salt water conduit, to feed the compressed vapor to the last-named radiators. A sweet water output feeds sweet water condensate from the evaporator to the sweet water conduit, and preferably also from the additional heater.

A steam turbine may be provided to operate the compressor, and a further heater may be arranged in the salt water circuit, the turbine being connected to the radiator of the further heater to feed escaped steam from the turbine to the further heater, and a sweet water output feeding sweet water condensate from the radiator of the further heater to the sweet water conduit. However, the heat source or the last-named heater may be any other suitable outside source of heat.

Brief description of drawing

The single figure of the drawing is a flow diagram giving an example of an installation arranged according to the invention and described in detail hereinbelow.

Detailed description

Salt water or brine enters a salt water circuit at A and flows through radiators in the direction indicated by arrows through a pair of heat exchangers 29, 30 and successively into a series of heaters 11, 12, 13, 14, 15, additional heater 16 and further heater 17. The salt water is heated in each heater, and a first series of flasks 18, 19, 20, 21 and 22 is associated with respective ones of heaters 15, 14, 13, 12 and 11. The heated salt water is partially evaporated by expansion in the flasks, and the resultant steam or water vapor serves to heat the salt water in the heaters whereinto the steam rises through conduits 18a, 19a, 20a, 21a and 22a. A second series of flasks 23, 24 and 25 receives sweet water formed in heaters 15, 14, 13 by condensation of the salt water vapor, the sweet water passing into the flasks 23, 24, 25 through conduits 15a, 14a, 13a. The sweet water in the latter flasks is also partially evaporated by expansion, and these flasks are connected to the conduits 19a, 20a, 21a of the heaters 14, 13, 12 to feed the sweet water vapor or steam thereto, the condensed sweet water from the second series of flasks flowing through the sweet water conduit 25a into a storage tank 32.

In accordance with the present invention, an evaporator 26 is arranged between the last heater 15 of the series of heaters and the additional heater 16, in the direction of flow of the salt water. A compressor 27 is arranged to receive the vapor from evaporator 26 and compresses the vapor. The compressor is operated by a steam turbine 28 which receives steam from a steam plant (not shown).

A further heater 17 receives heated salt water from heater 16, an outside heat source being used to operate heater 17 where the salt water is further heated. In the illustrated embodiment, this outside heat source is escaped steam fed to this heater from steam turbine 28. The sweet water condensate formed in the heater 17 is returned to the steam plant which feeds turbine 28.

The operation of the installation will partly be obvious from the above description of its structure and will be further elucidated hereinafter.

Heat exchanger 29 is heated by the hot brine coming from flask 22 through conduit 22a while heat exchanger 30 is heated by the hot sweet water coming from the tank 32 through conduit 32a to pre-heat the salt water entering the installation at A so that warm salt water flows into the first heater 11 of the series of heaters. The salt water successively passes through heaters 12, 13, 14 and 15 whence it flows into evaporator 26. A fraction of the salt water is evaporated therein, and the resultant steam or vapor rises through conduit 26a and is compressed in compressor 27 whence the compressed, high-caloric steam is returned through conduit 27a to the evaporator radiator to heat the evaporater. In compressing the steam, its temperature is increased and its energy level accordingly raised so that more calories are available than are needed for heating the evaporator. This excess heat is used to heat the radiator of additional heater 16 where salt water is received from the evaporator through conduit 16a.

Output pipes from the evaporator 26 and additional heater 16 feed sweet water condensate to the sweet water conduit B wherein the flasks 23, 24, 25, the storage tank 32 and the heat exchanger 30 are arranged in series.

The output 17a of further heater 17 is connected to the first flask 18 of a series of flasks to feed brine from the heater to the flasks, the brine being partially evaporated in flasks 18, 19, 20, 21 and 22 because the pressures in the radiators in the heaters to which these flasks decrease successively from heater 15 to heater 11, the evaporated fraction of the brine being returned to the respective heaters, and the output of flask 22 feeding hot brine to heat exchanger 29, as explained hereinabove.

The sweet water produced by condensation of the water vapor on the radiator of heater 15 is fed through conduit 15a into the sweet water condensate conduits B and to the flask 23, and a branch conduit connects this flask to the return conduit 19a from flask 19 to heater 14. Because of the pressure differential between the radiators of heaters 15 and 14, a fraction of the sweet water in flask 23 is evaporated and this evaporated fraction is used together with that emanating from flask 19 to heat the radiator of heater 14.

The sweet water fraction which has not been evaporated in flask 23 flows successively through flasks 24 and 25 where sweet water fractions again are evaporated and returned to the respective heaters to aid in heating them in the manner indicated in connection with heater 14. The sweet water fraction from flask 25 as well as the sweet water condensates from heaters 12 and 11 are fed through conduits 25a, 12a, 11a to storage tank 32, and the hot sweet water thus produced in the installation is used to heat exchanger 30, as hereinabove mentioned.

Under otherwise like operating conditions, an installation using an outside steam source for heating the radiator of the last heater instead of the apparatus 26, 16, 17 produces notably less sweet water than the present installation. In effect, an additional amount of sweet water is produced in evaporator 26 and heater 16 while the sweet water output of heaters 11 to 15 is only slightly decreased. The efficiency of the installation increases with the capacity of evaporator 26 and compressor 27 which, in turn, depends on the power of turbine 28.

For example, in an installation such as described and illustrated and comprising 15 heaters upstream of the evaporator, in the direction of flow of the salt water, wherein water equal to five times the amount of steam used in turbine 28 is evapoarted in evaporator 26, the steam consumption per ton of sweet water produced is reduced 70%, as compared to that in a conventional installation operating under the same conditions without the evaporator.

It will be obvious to those skilled in the art, that the two aded heaters 16 and 17 may be replaced by a single additional heater whose radiator would be heated simultaneouly by a fraction of the compressed steam coming from compressor 27 and by the steam escaping from turbine 28. Also, it would be possible to arrange the added heater or heaters in the salt water conduit between the last heater 15 of the series of heaters and the evaporator 26, rather than behind the evaporator, as illustrated.

Furthermore, instead of feeding the sweet water condensate from the evaporator 26 and heater 16 to flask 23, this sweet water output could be used to heat a fraction of the salt water entering the installation, and then to be mixed with the sweet water coming from heat exchanger 30.

It is also possible, as will be obvious, to feed the sweet water condensate from the heater 17 back to the sweet water conduit or to use it to heat a fraction of the salt water entering the installation, and a fraction of the cold water coming from heat exchanger 30 could be sent to the steam plant (not shown) which operates turbine 28.

The steam turbine 28 may be replaced by any other suitable source of power, such as an electric motor, a gas turbine, an internal combustion engine, or the like, depending on the most economical source of power available at the site of the installation. Where a steam turbine is used, the further heater 17 may be heated by such outside heat sources as low-pressure steam or electricity, or any other suitable heat source.

If desired, the installation may be readily converted into a conventional one, simply by eliminating the evaporator 26 with its associated conduits and apparatus. This will be particularly useful in areas where electric power consumption varies considerably from time to time, such as day and night. During high power consumption, i.e. during the day, the installation may be run without the evaporator, when the turbine will serve to operate an alternator, while the evaporator and compressor will be placed into the salt water conduit during the night, i.e. during low power consumption, when the alternator is switched off and the turbine runs the compressor.

Many other modifications and variations may occur to those skilled in the art, particularly after benefitting from the present teaching, without departing from the spirit and scope of the present invention.

I claim:

1. In an installation for producing sweet water from salt water, comprising an evaporator, a salt water conduit wherethrough salt water is adapted to flow in one direction, a series of heaters connected to said conduit for series flow therethrough upstream of the evaporator to heat the salt water as it flows in said direction, at least one last heater downstream of the evaporator, each heater including a radiator to condense salt water vapor in the form of sweet water condensate, a sweet water conduit receiving the condensed sweet water, and a series of flasks, the flasks being connected to receive heated salt water for series flow from the last heater and partially to evaporate the received salt water, said evaporator being connected to the salt water conduit upstream of the last heater and receiving heated salt water after passing through said heaters upstream of the evaporator, the evaporator including a radiator to vaporize a portion of the heated salt water, and including a compressor receiving the vaporized portion of the salt water from the evaporator and compressing the vapor, the compressor being connected to the radiator of the evaporator and to the radiator of the heater next thereto and downstream of the evaporator to feed the compressed vapor to said last-named radiators, a sweet water output feeding sweet water condensate from the evaporator the the sweet water conduit, and an energy source comprising steam for driving the compressor and supplying heat to the last heater downstream of the evaporator.

2. In the installation of claim 1, further comprising a sweet water output feeding sweet water condensate from the one downstream heater to the sweet water conduit.

3. In the installation of claim 1, wherein the energy source is a steam turbine operating the compressor, the turbine being connected to the radiator of the last downstream heater to feed escaping steam from the turbine to the last-named heater.

4. In the installation of claim 1, further comprising a sweet water output feeding sweet water condensate from the last downstream heater to the sweet water conduit, said energy source being a steam turbine operating the compressor, the last heater having a radiator connected to the turbine to receive escaped steam from the turbine and a heated salt water output feeding heated salt water from the last heater to a first one of said series of flasks.

References Cited

UNITED STATES PATENTS

| | | | |
|---|---|---|---|
| 3,119,752 | 1/1964 | Checkovich | 203—11 |
| 3,257,290 | 6/1966 | Starmer | 202—173 |
| 3,249,517 | 5/1966 | Lockman | 202—159 X |
| 3,216,910 | 11/1965 | Langer et al. | 202—173 |
| 3,305,455 | 2/1967 | Loebel | 203—7 |
| 3,396,086 | 8/1968 | Starmer | 202—183 X |
| 3,412,558 | 11/1968 | Starmer | 60—57 |
| 3,420,747 | 1/1969 | Williamson | 202—173 |

NORMAN YUDKOFF, Primary Examiner

F. E. DRUMMOND, Assistant Examiner

U.S. Cl. X.R.

203—11, 24, 26, 100